July 14, 1931.                    J. SENFT                    1,814,639

ANTISKID CHAIN

Filed May 31, 1930

INVENTOR
John Senft,
By Archworth Martin,
Attorney.

Patented July 14, 1931

1,814,639

UNITED STATES PATENT OFFICE

JOHN SENFT, OF YORK, PENNSYLVANIA, ASSIGNOR TO UNITED STATES CHAIN & FORGING COMPANY, OF PITTSBURGH, PENNSYLVANIA, A CORPORATION OF DELAWARE

ANTISKID CHAIN

Application filed May 31, 1930. Serial No. 458,661.

My invention relates to anti-skid chains, and more particularly to chains of the type commonly employed in connection with automobile wheels.

One object of my invention is to provide a chain which is better resistant to skidding than various types of chains heretofore employed.

Another object of my invention is to provide a chain which will have a maximum resistance to wear and hence increased life, for a given quantity of material.

Still another object of my invention is to provide a chain of generally improved structure.

Figure 1:
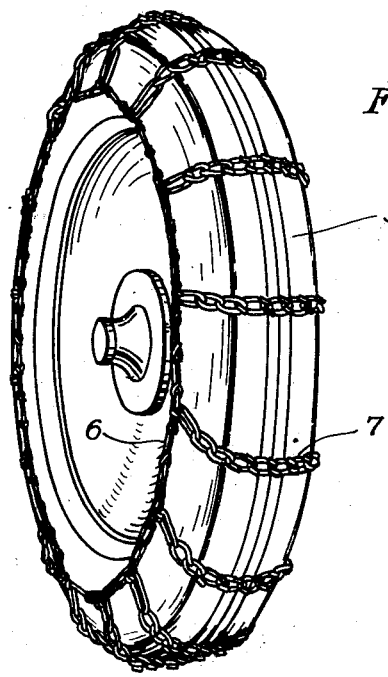
Figure 2:
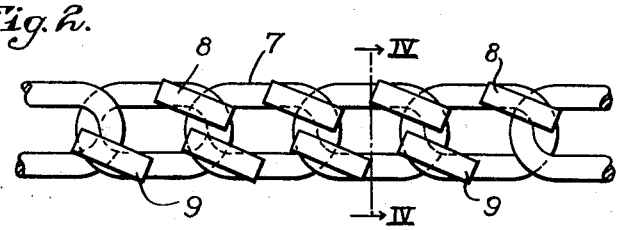
Figure 3:
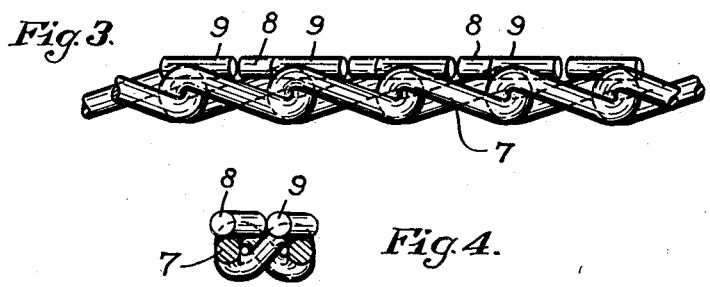
Figure 4:
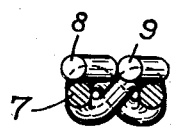

One form which my invention may take is shown in the accompanying drawing, wherein Figure 1 is a perspective view of a wheel equipped with my anti-skid chain; Fig. 2 is a plan view, on an enlarged scale, of a portion of one of the tread chains or cross chains of Fig. 1; Fig. 3 is a side elevational view thereof, and Fig. 4 is a view taken on the line IV—IV of Fig. 2.

The chain structure is shown as applied to the tire of a motor vehicle wheel 5, and consists of a pair of side chains 6 which may be of the usual form, and cross chains 7. The cross chains are shown as composed of links twisted approximately 90° in the usual manner, so that they may all lie in substantially a given plane, that is, that each will engage the roadway in approximately a flatwise position so far as the twists of the link permit, instead of some of the links engaging the roadway flatwise and others edgewise.

As is well-known, the raised portions of the twisted links wear through rather rapidly in service, thus necessitating frequent replacements or repairs of the cross chains. The purpose of this invention is to materially increase the life of the cross chains without adding greatly to the weight thereof, and at a small increase in cost of manufacture, as compared to the cost of various standard types of anti-skid chains.

To this end, I provide metal studs 8 and 9 which may be of a gauge or thickness approximating the gauge of the material entering into the tread links, or which may be of other suitable material and of any desired thickness. By making the studs 8 and 9 from stock corresponding to that entering into the manufacture of the tread links 7, the life of the cross or tread chains is approximately doubled, since the studs or calks 8 and 9 must be first worn through before their corresponding links become worn to any considerable extent.

The studs 8 and 9 are shown in the form of short bars which are welded or otherwise suitably secured to the raised portions of the links, and are of course secured to the outer sides of the links, so that they will have engagement with the roadway during traveling movement of the wheel.

The diagonal arrangement of the studs with respect to their links not only facilitates placing of the studs in position upon the raised portions of the links, but tends to resist skidding. Usually, the tire chains are applied somewhat loosely so that when a given cross chain engages the roadway during rotation of the wheel, such chain will lie loosely upon the roadway with its links in non-symmetrical relation to one another, thus causing the calks to project at various angles and to better resist skidding sidewise, or slippage of the wheel in a circumferential direction.

In the drawings, the calks 8 and 9 are shown as applied to the intermediate tread links, which are the links that receive substantially all of the wear, and are the only ones commonly worn through. It will, of course, be apparent that any desired number of the links in a given cross chain may be provided with the calks.

I claim as my invention:—

1. An anti-skid cross chain composed of inter-connected links each twisted through approximately 90°, and bar-like calks welded at their mid portions to those projecting portions of the links which result from the twisting thereof, each calk extending in a direction diagonally to the longitudinal center line of its link, and extending in both directions beyond the adjacent end of the underlying link.

2. An anti-skid cross chain composed of interconnecting links each twisted to permit the said links to lie in approximately a common plane, and bar-like calks welded at their mid portions to the outer sides of the projecting portions of the links which result from the twisting thereof, the said calks lying in a plane substantially parallel to the plane of the links, and each calk extending in both directions beyond the end of the link underlying that link to which it is connected.

In testimony whereof I, the said JOHN SENFT, have hereunto set my hand.

JOHN SENFT.